US006553748B2

United States Patent
Josset et al.

(10) Patent No.: US 6,553,748 B2
(45) Date of Patent: Apr. 29, 2003

(54) PICK-UP SUPPORT WHEEL MOUNTING ARRANGEMENT

(75) Inventors: Etienne Josset, Gray (FR); Frederic Paillet, Gray (FR); Raymond Uros, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/923,022

(22) Filed: Aug. 6, 2001

(65) Prior Publication Data

US 2002/0017092 A1 Feb. 14, 2002

(30) Foreign Application Priority Data

Aug. 8, 2000 (DE) .......................... 100 38 596

(51) Int. Cl.[7] .................. A01D 39/00; A01D 43/02; A01D 75/00
(52) U.S. Cl. .......................... 56/341; 56/16.1
(58) Field of Search .................. 56/14.4, 208, 364, 56/14.9, 18.1, 15.8, 341, 342, 343, 344; 100/88, 89

(56) References Cited

U.S. PATENT DOCUMENTS 3,962,849 A * 6/1976 Stoessel et al. ............ 53/329.2
4,855,924 A * 8/1989 Strosser et al. ................ 100/4
4,945,719 A * 8/1990 Schrag et al. ............... 100/179
5,819,516 A * 10/1998 Anderson et al. ............. 100/88

FOREIGN PATENT DOCUMENTS

FR           2 766 322      1/1999
WO         WO 98/17096      4/1998

* cited by examiner

Primary Examiner—Robert E. Pezzuto
Assistant Examiner—Árpád Fábián Kovács

(57) ABSTRACT

A baler pick-up includes a pair of support wheels, each of which is connected to the pick-up by a mounting arrangement permitting the wheel to be selectively moved from a working position outboard of the pick-up to an inboard, elevated transport or non-working position. Each mounting arrangement comprises a holder fixed to the pick-up and including a transverse pipe and a projection formed from a plate and spaced outwardly from and end of the pipe. The arrangement further comprises a wheel mounting bracket including a cylindrical tube pivotally and slidably received in the pipe and in a hole provided in the projection, the tube carrying a ring captured between the end of the pipe and the projection and containing a throughbore aligned with one of a pair of crossbores provided in the tube and receiving a linchpin bolt for retaining the wheel mounting bracket so as to dispose the wheel in a selected one of its positions.

6 Claims, 3 Drawing Sheets

PICK-UP SUPPORT WHEEL MOUNTING ARRANGEMENT

FIELD OF THE INVENTION

The present invention concerns a mounting arrangement for a wheel belonging to a product pick-up or collection apparatus.

BACKGROUND OF THE INVENTION

FR-A1-2 766 322 discloses a harvested product pick-up or collection apparatus with support wheels that are each attached to a side wall by a bracket. The bracket is held by vertical and horizontal bearings so that it can be pivoted both vertically and horizontally, such that the support wheel is pivotable into a free space behind the pick-up to reduce its transport width.

WO-A1-98/17096 discloses a support wheel attached to each side of a pickup by a bracket that is configured in the form of an inverted "U". The size, shape, and design of the bracket are selected so that a large free space exists between the wheel and the pick-up, which prevents the build-up of harvested product.

While the first-listed prior art document discloses the desirable feature of being able to narrow the transport width, the design has the drawback of being relatively expensive. The attachment of the wheel in the second-listed prior art document does not have the feature of being able to move the wheels to a narrowed transport position.

SUMMARY OF THE INVENTION

According to the present invention, there is provided an improved arrangement for attaching support wheels to a harvested crop pick-up.

A broad object of the invention is to provide a relatively inexpensive wheel mounting arrangement which permits the wheel to be easily moved between working and non-use or transport positions.

A more specific object of the invention is to provide a wheel mounting arrangement, as set forth in the previous object, wherein the wheel may be adjusted between different vertical positions relative to the pick-up.

Yet another specific object of the invention is to provide a wheel mounting arrangement, as set forth in the first object, wherein the wheel is retained in its various adjusted positions with a fastener requiring no tools to install or to remove it.

These and other objects will become apparent from a reading of the ensuing description together with the appended drawings.

DESCRIPTION OF THE PREFERRED EMBODIMENTS

Figure 1:
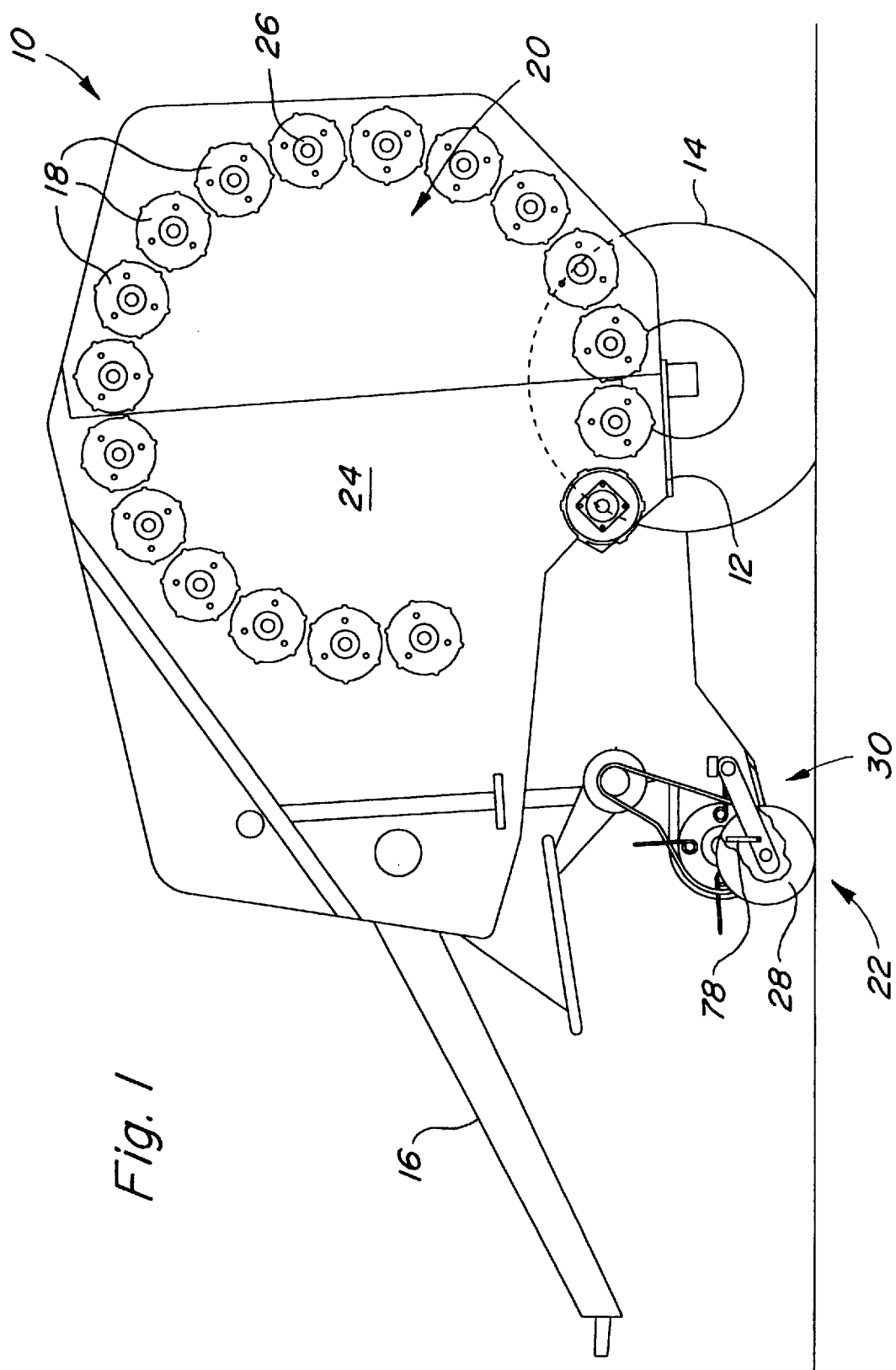
FIG. 1 is a somewhat schematic, left side elevational view showing a large round baler equipped with a pick-up supported by a wheel attached thereto in accordance with the principles of the present invention.

Referring now to FIG. 1 there is shown a large round baler 10 including a frame that is supported on the ground by support wheels 14, and can be attached to a towing vehicle by a towbar 16. Bale-forming rollers 18 encircle a baling chamber 20, where the product that is collected from the ground by a pick-up or product collection apparatus 22 can be compacted into a bale. The baling chamber 20 comprises a front fixed housing part 24 to an upper rear location of which is mounted a rear housing part 26 for swinging between a lowered working position, as illustrated, and a raised discharge position for permitting formed round bales to be deposited on the ground. The pick-up 22 is supported at its opposite sides by a respective wheel 28 which holds the pick-up 22 at selected heights above the ground level, and is attached to the pickup by means of a mounting device 30 in accordance with the invention.

The baler 10 described thus far has an appropriate construction; however, the use of the mounting device 30 in accordance with the invention is not limited to the aforementioned type of round baler in particular, nor to round balers in general. Other devices including other balers, load-bearing trailers, field choppers and combines may also be considered. Instead of being a pick-up, the collection apparatus 22 can as well be a cutting apparatus, a corn harvester, etc.

Figure 2:
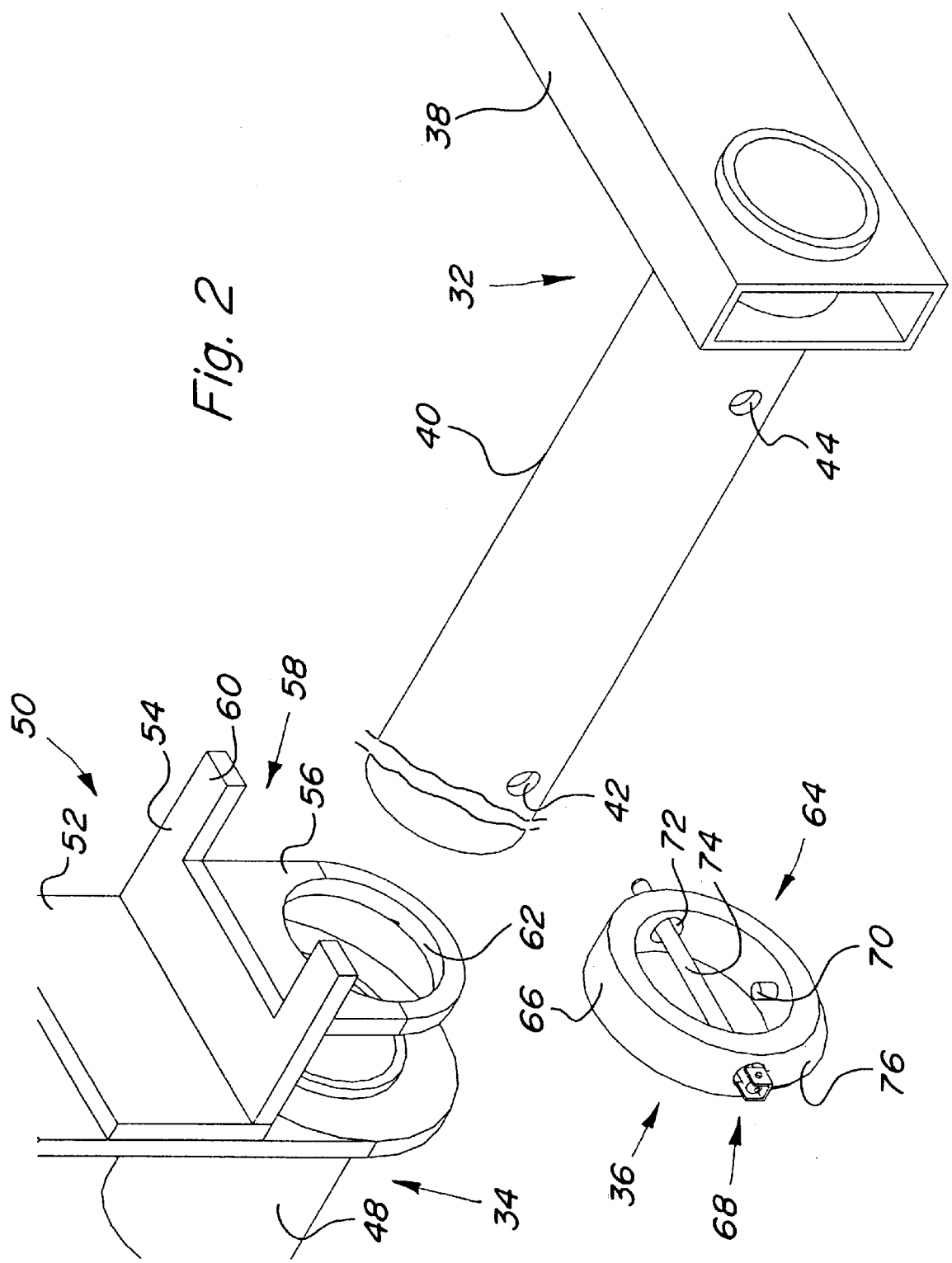
FIG. 2 is a right rear perspective exploded view showing the right-hand wheel mounting arrangement of the present invention.
Figure 3:
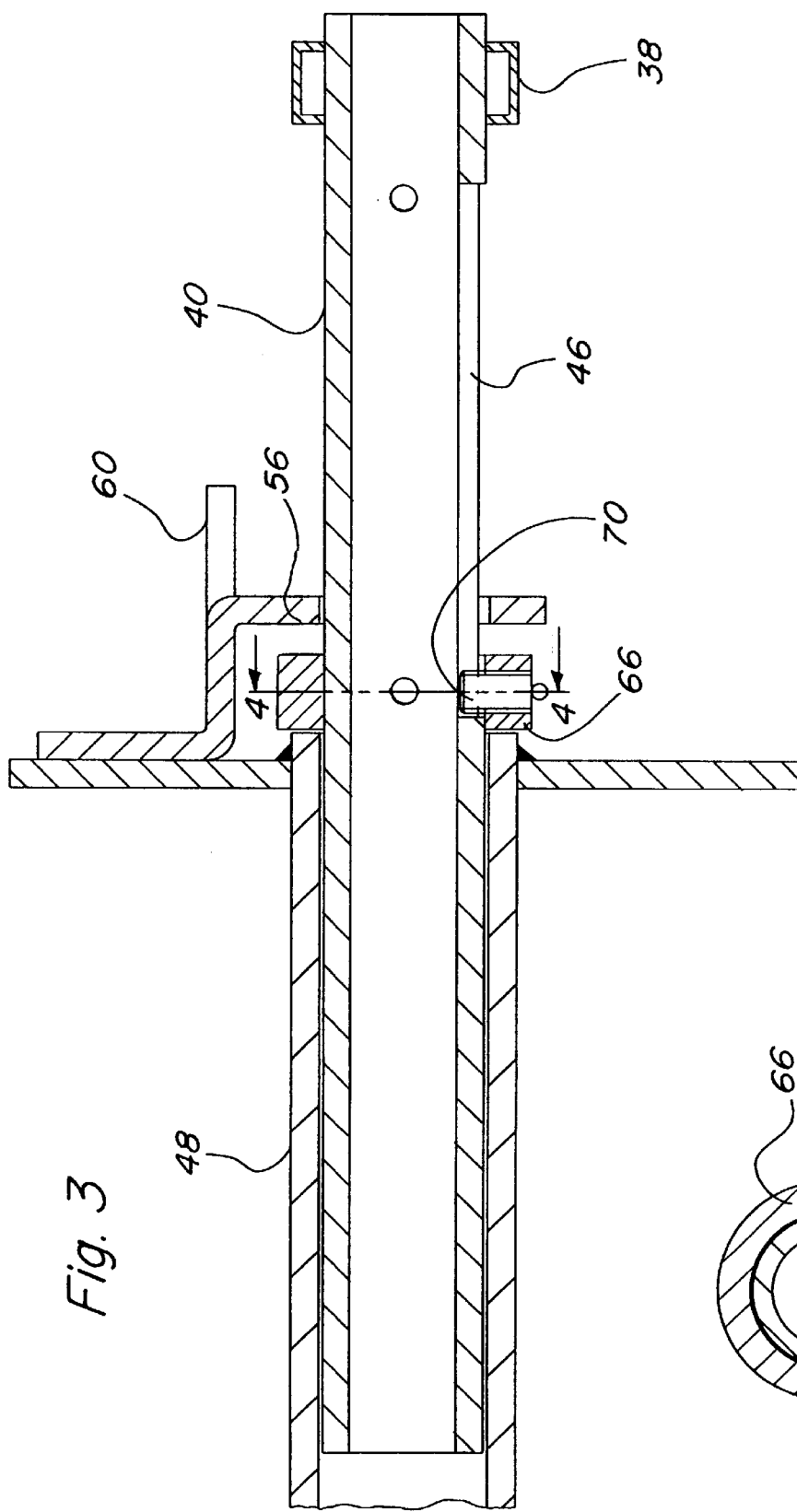
FIG. 3 is a longitudinal sectional view taken through tubular members forming part of the wheel mounting arrangement shown in FIG. 2.
Figure 4:
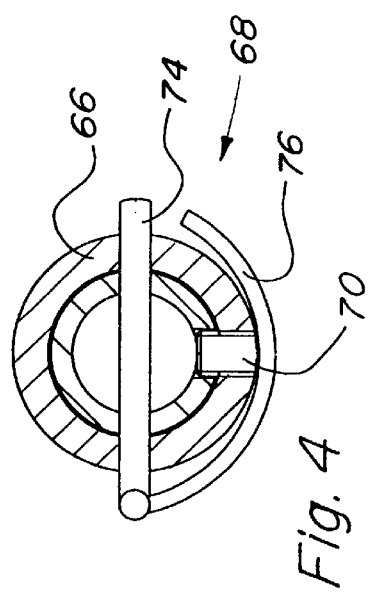
FIG. 4 is a sectional view taken along line 4—4 of FIG. 3.

Referring now to FIGS. 2–4, it can be seen that the mounting device 30 includes a pivot bracket 32, a holder 34 and a securing element 36, with the pivot bracket 32 including first and second arms 38 and 40, respectively.

The first pivot bracket arm 38 is configured as a tube having a rectangular cross section, carrying the wheel 28 on one end and the second arm 40 on the other end. The first arm 38 extends perpendicular to the second arm 40, and pivots in a vertical plane.

The second pivot bracket arm 40 is in the form of a cylindrical pipe or rod, featuring first and second cross bores 42 and 44, respectively, spaced lengthwise or axially along the arm 40 and having the same radial orientation relative to the central axis of the arm. Thus, the bores 42 and 44 are separated from one another along an adjustment path of the wheel 28, transverse to the driving direction of the baler 10. It is also possible to include one or more additional openings. The cross bore 42 is located outboard of an inner end of the second arm 40, while the cross bore 44 is located just inboard of the connection of the second arm 40 with the first arm 38. As can be seen in FIG. 3, an axially running slot 46 is located on the underside of the second arm 40, that has a length slightly greater than the distance between the cross bores 42 and 44.

The holder 34 includes a cylindrical pipe 48 that, in this present case, is secured in or through a side wall of the pick-up 22, and extends toward this side wall, which is recessed from the outer edge. The pipe 48 is oriented such that its central longitudinal axis extends horizontally and transverse to the driving direction of the baler and defines the pivot axis of the bracket 32. The inside diameter of the pipe 48 is dimensioned to permit the second arm 40 of the pivot bracket 32 to turn with only a relatively small amount of play. The second arm 40 of the bracket 32 is thus telescoped within the pipe 48 and depending on the position of the bracket 32, a more or less extensive overlap occurs between the second arm 40 and the pipe 48.

Holder 34 further includes a first retainer component 50 configured from sturdy sheet metal or plate in one unit that is either mounted on a side wall or other structure of the pick-up 22, or pipe 48. The component 50 features a vertical plate 52, a horizontal crosspiece 54 projecting outwardly from and welded along a bottom part of the vertical plate 52, and a vertical projection 56 welded to a bottom surface of the crosspiece 54 at a location spaced outwardly from a lower edge of the plate 52, and hence an outer end of the pipe 48. In this embodiment example, the plate 52 is fixed flush against the side wall of the pick-up 22. In its side opposite from that engaged with the plate 52, the horizontal crosspiece 54 includes a square-cornered, outwardly opening cut-out or recess 58 having an inner edge disposed flush with an outer vertical surface of the projection 56. The crosspiece material bounding front and rear parts of the cut-out 58 form front and rear stops 60 separated by a distance commensurate with the width of the first arm 38 of the pivot bracket 32 so that the arm 38 may be placed in the recess 58 when the wheel 28 is moved to a non-use or transport position, in a manner described below. Projection 56, having an upper part formed from the material removed from the crosspiece 54 to form the recess 58, includes a bore 62 which is aligned with and the same size as the inside diameter of the pipe 48. The gap from the projection 56 to the outer end of the pipe 48 is dimensioned for receiving, and preventing transverse movement of, another retainer component 64.

The second retainer component 64 includes a ring 66, a keyed bolt 68 and a guide pin 70. The ring 66 has an internal diameter that enables it to be slid over the second arm 40 of the pivot bracket 32, with relatively little play, and has an outer diameter that allows it to fit between the second arm 40 and the crosspiece 54 of the first retainer component 50 and a width that permits it to be received between the end of the pipe 48 and the projection 56. A bore 72 passes radially through the ring 66 and can be selectively placed in alignment with the openings 42 and 44. A keyed bolt 68 is configured as a standard linchpin including a bolt 74 which can pass through the bore 72, the bolt 74 being releasably retained in place by a semicircular spring bracket 76 can be laid on the circumferential surface of the ring 66. Guide pin 70 extends radially within the inner area of the ring 66 and can engage the slot 46 in the second arm 40 in order to cause the ring 66 to be held in a fixed rotational relationship relative to the second arm 40 when the bolt 74 is removed and the arm 40 moved inward or outward relative to the ring 66. Optimally, guide pin 70 will be screwed into the ring 66.

Finally, a connection 78 (see FIG. 1) is provided between the first pivot arm 38 and the pick-up 22. This connection 78 securely connects the pivot bracket 32 to the pick-up 22 in at least one direction, so that the pick-up is raised if, for example, the wheel 28 rolls over a rock or the like.

The structure shown in FIG. 2 may be assembled as follows:

Ring 66, absent the keyed bolt 68 of the linchpin, is inserted into the gap between the end of the pipe 48 and the projection 56 and aligned with the bore 62. Then, the second arm 40 is pushed through the bore 62, ring 66, and into the pipe 48. Next, the guide pin 70 is screwed or pressed in, where ring 66 is configured so that the guide pin 70 is inserted into the slot 46 of the second arm 40. Then the bolt 74 is inserted through the cross bore 72 in the ring 66 and the cross bore 42. This holds the pivot bracket 32 in place. Connection 78 is then placed between the pickup 22 and the bracket 32. In this position, the wheel 28 is ready for operation and can be brought into engagement the ground by lowering the pick-up 22.

To place one or the other of the wheels 28 in its out-of-use or transport position, first connection 78 is removed and then keyed bolt 68 is removed by pivoting spring bracket 76 back and withdrawing the bolt 74 from the cross bore 42. Next, the associated bracket 32 with its first arm 38 is pivoted upwardly about the axis of the second arm 40 until the arm 38 is vertical and with the wheel 28 in an elevated position behind the front of the pick-up 22. Then the pivot bracket 32 is pushed inward towards the side of the pick-up 22, until the bolt 74 can be inserted into the cross bore 44. Here, the ring 66 already has the right position on the circumference of the arm 40 since the guide pin 70 is located in the guide slot 46 and prevented from turning. Because of the sliding motion, the wheel 28 comes to be positioned behind the side boundary of the tine rotor of the pick-up 22. The required displacement distance depends on whether the holder 34 is mounted on, or in a recess of, the pick-up side wall, and the wheel 28 is placed on the outer side of the first arm 38, or whether the holder 34 is on the outer wall of the pick-up and the wheel 28 is mounted on the inside of the first arm 38. In this position, the first arm 38 ends up in the recess 58 between stops 60, so that the bracket 32 and the wheel 28 are held in place even in the event of shocks. It is here noted that other arrangements of stop surfaces may be provided to place the first arm 38 in other orientations.

In the presented embodiment example, a condition has be selected in which the wheel 28 is in its out-of-use position. If the wheel 28 is intended to be used when placed behind the tine rotor of the pick-up, then the first retainer component 50 and its respective recess 58 must be attached and oriented appropriately.

Having described the preferred embodiment, it will become apparent that various modifications can be made without departing from the scope of the invention as defined in the accompanying claims.

What is claimed is:

1. In a product collection apparatus supported by wheels, each of which is connected thereto by a support wheel mounting device designed to permit the wheel to be placed in different positions relative to the apparatus, the improvement comprising: said support wheel mounting device including a holder arrangement fixed to the collection apparatus; a wheel carrying bracket; said wheel carrying bracket being mounted to said holder arrangement for pivoting vertically relative thereto, and for moving transversely relative thereto, so as to selectively place said wheel at least in extreme outward and inward positions relative to said collection apparatus; and a releasable retainer arrangement for selectively securing said holder arrangement and bracket together so as to dispose said wheel in one of said extreme outward and inward positions.

2. The product collection apparatus as defined in claim 1 wherein said holder arrangement and wheel carrying bracket respectively include first and second mounting components that telescope relative to each other.

3. The product collection apparatus as defined in claim 2 wherein said first mounting component includes a transverse, cylindrical pipe and said second mounting component includes a cylindrical member received in said pipe.

4. The product collection apparatus as defined in claim 3 wherein said retainer arrangement includes a first retainer component including a vertical plate spaced axially from an outer end of said pipe, and containing a circular opening having a diameter equal to, and aligned with, an inside diameter of said pipe; said cylindrical member extending through said circular opening into said pipe; and said retainer arrangement including a second retainer component including a ring having an axial dimension substantially equal to the space between said pipe end and said vertical plate; said ring being received on said cylindrical member and located in said space between said pipe end and said vertical plate; said cylindrical member having inner and outer bores located therein at locations spaced axially from each other by a distance corresponding to that between said extreme outward and inward positions; said ring including a throughbore aligned with a selected one of said inner and outer cross bores; and a fastener being received in said throughbore and selected one of said inner and outer cross bores.

5. The product collection apparatus as defined in claim 4 wherein said inner and outer cross bores have the same radial disposition relative to a central axis of said cylindrical member; said cylindrical member including an axial slot provided in one side thereof; and a guide pin carried by, and extending axially towards the center of said ring; and said guide pin being received in said axial slot, whereby said ring is retained in a proper attitude for being aligned with said pair of cross bores when said cylindrical member is telescoped in said pipe.

6. The product collection apparatus as defined in claim 4 wherein said wheel carrying bracket includes a first arm defined by said cylindrical member and a second arm fixed to, and projecting at a right angle to and outer end of said first arm; a wheel being mounted to an end of said second arm remote from said first arm; said first retainer arrangement further including a horizontal plate joined to said vertical plate and defining a receptacle shaped complementary to a cross section of said second arm and positioned for receiving the second arm when the second arm is pivoted to a vertically extending position and moved to dispose said wheel in said inner extreme position.

* * * * *